United States Patent
Tsuruta

(10) Patent No.: US 8,788,948 B2
(45) Date of Patent: *Jul. 22, 2014

(54) ELECTRONIC MAIL DISPLAY DEVICE

(71) Applicant: International Business Machines Corporation, Armonk, NY (US)

(72) Inventor: Kazuhiro Tsuruta, Kanagawa (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/732,387

(22) Filed: Jan. 1, 2013

(65) Prior Publication Data

US 2013/0132492 A1    May 23, 2013

Related U.S. Application Data

(63) Continuation of application No. 12/353,377, filed on Jan. 14, 2009, now Pat. No. 8,490,001.

(30) Foreign Application Priority Data

Jan. 23, 2008 (JP) .................................. 2008-013156

(51) Int. Cl.
```
G06F 3/00      (2006.01)
G06F 17/00     (2006.01)
G06F 3/048     (2013.01)
```

(52) U.S. Cl.
USPC .......................... 715/752; 715/209; 715/838

(58) Field of Classification Search
USPC ......... 715/209, 210, 234, 243, 733, 751, 752, 715/760, 835, 853; 709/206; 713/153
See application file for complete search history.

(56) References Cited

U.S. PATENT DOCUMENTS

| | | | |
|---|---|---|---|
| 5,818,447 A | 10/1998 | Wolf et al. | |
| 6,546,417 B1 | 4/2003 | Baker | |
| 6,839,411 B1* | 1/2005 | Saltanov et al. | 379/88.13 |
| 7,421,514 B2 | 9/2008 | Lee | |
| 7,475,362 B2 | 1/2009 | Fujiyoshi | |
| 7,509,386 B2 | 3/2009 | Miyashita | |
| 7,593,991 B2* | 9/2009 | Friedman et al. | 709/206 |
| 7,647,559 B2 | 1/2010 | Yozell-Epstein et al. | |
| 7,716,593 B2 | 5/2010 | Durazo et al. | |
| 7,730,147 B1 | 6/2010 | Derhak et al. | |
| 7,783,708 B2 | 8/2010 | Zaner-Godsey et al. | |

(Continued)

FOREIGN PATENT DOCUMENTS

| | | |
|---|---|---|
| JP | 11120097 A | 4/1999 |
| JP | 2001273205 A | 10/2001 |

(Continued)

*Primary Examiner* — Omar Abdul-Ali
*Assistant Examiner* — Andrew Tank
(74) *Attorney, Agent, or Firm* — Roy W. Truelson

(57) ABSTRACT

To provide a technique for facilitating the management of an attachment file attached to an electronic mail. A client apparatus acquires attachment position information in a text of the electronic mail and stores it associated with an identifier of the electronic mail, in receiving the electronic mail with attachment file. Upon receiving an instruction for displaying the electronic mail from the user, the client apparatus arranges a graphic representing the attachment file of the electronic mail on a child screen that displays the reduced screen of a parent screen that displays the electronic mail based on the corresponding attachment position information, and displays the child screen together with the parent screen.

18 Claims, 17 Drawing Sheets

(56) References Cited

U.S. PATENT DOCUMENTS

| | | | |
|---|---|---|---|
| 7,814,425 | B1 | 10/2010 | O'Shaugnessy et al. |
| 7,870,089 | B1 | 1/2011 | Hall et al. |
| 7,900,149 | B2 | 3/2011 | Hatcher et al. |
| 7,970,834 | B2 | 6/2011 | Daniels et al. |
| 8,108,763 | B2 | 1/2012 | Gao et al. |
| 2003/0060989 | A1 | 3/2003 | Shigehara et al. |
| 2003/0093565 | A1* | 5/2003 | Berger et al. ............... 709/246 |
| 2003/0217259 | A1 | 11/2003 | Wong et al. |
| 2004/0068545 | A1 | 4/2004 | Daniell et al. |
| 2004/0268246 | A1 | 12/2004 | Leban et al. |
| 2005/0114671 | A1 | 5/2005 | Little et al. |
| 2005/0182933 | A1* | 8/2005 | Ritz et al. .................. 713/168 |
| 2006/0265390 | A1 | 11/2006 | Aldrich et al. |
| 2007/0016636 | A1 | 1/2007 | Boerries et al. |
| 2007/0233791 | A1 | 10/2007 | Sylthe et al. |
| 2007/0255792 | A1 | 11/2007 | Gronberg et al. |
| 2008/0005247 | A9 | 1/2008 | Khoo |
| 2008/0162651 | A1 | 7/2008 | Madnani |
| 2008/0174570 | A1 | 7/2008 | Jobs et al. |
| 2009/0055643 | A1* | 2/2009 | Brown et al. ............... 713/160 |
| 2009/0177754 | A1 | 7/2009 | Brezina et al. |

FOREIGN PATENT DOCUMENTS

| | | | |
|---|---|---|---|
| JP | 20011318868 | A | 11/2001 |
| JP | 2002158690 | A | 5/2002 |
| JP | 2003051851 | A | 2/2003 |
| JP | 2004237041 | | 8/2004 |
| JP | 2005032052 | A | 2/2005 |

* cited by examiner

Figure 3

| AIv ID | Message ID | Subject | Attachment File Name | Attachment File Position | Attachment FileType | Attachment File Size | Attachment File State ||||
|---|---|---|---|---|---|---|---|---|---|---|
| | | | | | | | Number of Accesses | Deleted State | Number of Edits |
| M_A_001 | 001 | M | a.doc | (Xa, Ya) | doc | 110kB | 10 | NO | 000 |
| M_B_001 | 001 | M | b.jpg | (Xb, Yb) | jpg | 1MB | 1 | YES | 002 |
| L_c_002 | 002 | L | c.doc | (Xc, Yc) | doc | 70kB | 4 | NO | 001 |
| ... | ... | ... | ... | ... | ... | ... | ... | ... | ... |

| URL | Message ID | Subject | Attachment File Name | Attachment File Type | Attachment File Mode | Attachment File Size | Attachment File State | Attachment File State | | |
|---|---|---|---|---|---|---|---|---|---|---|
| | | | | | | | | Number of Accesses | Deleted State | Number of Edits |
| URL1 | 001 | M | a.jpg | (Xa, Ya) | Call | jpg | 2MB | 0 | NO | 000 |
| - | 002 | L | b.doc | (Xb, Yb) | Attached | doc | 70kB | - | - | - |
| ... | ... | ... | ... | ... | ... | ... | ... | ... | ... | ... |

(b)

| URL | Message ID | Subject | Attachment File Name | Attachment File Type | Attachment File Mode | Attachment File Size | Attachment File State | Attachment File State | | |
|---|---|---|---|---|---|---|---|---|---|---|
| | | | | | | | | Number of Accesses | Deleted State | Number of Edits |
| URL1 | 001 | M | a.jpg | (Xa, Ya) | Call | doc | 2MB | 50 | NO | 000 |
| | 003 | | | (X'a, Y'a) | | | | | | |
| - | 2 | L | b.doc | (Xb, Yb) | Attached | jpg | 70kB | - | - | - |
| ... | ... | ... | ... | ... | ... | ... | ... | ... | ... | ... |

| AN ID | URL | Message ID | Subject | Attachment File Name | Attachment File Position | Attachment Mode | Attachment FileType | Attachment File Size | Attachment File State |||
|---|---|---|---|---|---|---|---|---|---|---|---|
| | | | | | | | | | Number of Accesses | Deleted State | Number of Edits |
| M_A_001 | URL1 | 001 | M | a.jpg | (Xa, Ya) | Call | jpg | 2MB | 1 | NO | 000 |
| M_B_001 | - | 001 | M | b.doc | (Xb, Yb) | Attached | doc | 70kB | 0 | NO | 000 |
| ... | ... | ... | ... | ... | ... | ... | ... | ... | ... | ... | ... |

(b)

| AN ID | URL | Message ID | Subject | Attachment File Name | Attachment File Position | Attachment Mode | Attachment FileType | Attachment File Size | Attachment File State |||
|---|---|---|---|---|---|---|---|---|---|---|---|
| | | | | | | | | | Number of Accesses | Deleted State | Number of Edits |
| M_A_001 | URL1 | 001 | M | a.jpg | (Xa, Ya) | Call | jpg | 2MB | 5 | NO | 000 |
| | | 003 | | | (X'a, Y'a) | | | | | | |
| M_B_001 | - | 002 | L | b.doc | (Xb, Yb) | Attached | doc | 70kB | 1 | YES | 000 |
| ... | ... | ... | ... | ... | ... | ... | ... | ... | ... | ... | ... |

ELECTRONIC MAIL DISPLAY DEVICE

CROSS-REFERENCE TO RELATED APPLICATION

This is a continuation of pending U.S. patent application Ser. No. 12/353,377, filed Jan. 14, 2009, entitled "Electronic Mail Display Program Product, Method, Apparatus and System", which is herein incorporated by reference. This application claims priority under 35 U.S.C. §120 of U.S. patent application Ser. No. 12/353,377, filed Jan. 14, 2009.

FIELD OF THE INVENTION

The present invention relates to a management method for an electronic mail with attachment file, and more particularly to techniques for facilitating the management of an attachment file attached to an electronic mail.

DESCRIPTION OF THE RELATED ART

The techniques for attaching a document or image file to the electronic mail are widely known, in which the sender can attach a file at any position of the text in the electronic mail. Also, the electronic mail is widely used as one means for information transfer by not only the individual but also the enterprise. In an intranet environment, the electronic mail with attachment file is often sent to a plurality of people such as all the participants with a project. Also, such mail with attachment file is repeatedly replied or transferred between the participants, and the attachment file is added every time.

By the way, the attachment file attached to the electronic mail is mostly a document file or an image file produced by the document creation software or table creation software, and generally has a large amount of volume. Therefore, the recipient of the electronic mail may want to delete the attachment file personally irrelevant or the attachment file not required. On the other hand, the recipient wants to display and sometimes edit the attachment file personally relevant. Therefore, it is desired to acquire quickly and easily what file is attached to the electronic mail, or the attachment file information regarding the attachment file.

As a technique for providing the attachment file information to the user, there is a Published Unexamined Patent Application No. 2003-67306. Patent Application No. 2003-67306 discloses an accumulation management method of accumulating one or more electronic mail data sent or received via an electronic mail server as a series of electronic mail histories, extracting a part or all of the attached document appended to the accumulated electronic mail data, and generating management information on the extracted attached document for one or more electronic mail data included in the generated electronic mail histories. And Patent Application No. 2003-67306 discloses a technique for displaying a list of attached documents sent or received among the electronic mails included in the electronic mail histories in response to a retrieval request with the retrieval conditions designating the electronic mail history.

Also, Patent Application No. 2000-3314 discloses an electronic mail receiving apparatus for preparing a condition table describing the receiving conditions for the attachment file attached to the electronic mail, acquiring the attachment file information that is information on the attachment file from header information in the electronic mail, judging whether or not it satisfies the receiving conditions in the condition table, and judging whether or not the attachment file can be received or not, in which if it is judged that the reception is possible, a receiving process for the attachment file is performed.

In the Published Unexamined Patent Application No. 2003-67306, the attached document is listed associated with one series of electronic mail histories (business histories) including one or more electronic mail data. This is because Patent Application No. 2003-67306 is aimed to directly refer to the attached document regarding the business history of interest without individual electronic mails, thereby reducing a burden required to refer to the attached document. Also, the management information of the attached document provided in the list is limited to the file name of attached document, the transmission date and time of electronic mail, the sender and the file volume of attached document.

However, it is difficult to judge whether or not the attachment file is directly related with the recipient, only based on the relevance of the attachment file to the business history interested or the management information of the attached document. That is, to make such a judgment, it is necessary to know for what course or purpose the attachment file is attached, and therefore to know the relationship between the attachment file and the text of the electronic mail to which the attachment file is attached.

Also, in Patent Application No. 2000-3314, the receiving conditions for the attachment file attached to the electronic mail are set in the condition table, thereby making it possible to selectively receive the attachment file to be processed by the recipient or the attachment file to confirm the contents by the recipient. However, a technique of the Patent Application No. 2000-3314 demands that such receiving conditions for the attachment file are set in advance. Further, the technique employs a predetermined nomenclature of file, whereby it is required to make a prior agreement for using such nomenclature between the users sending or receiving the mail.

An embodiment of this invention has been achieved to solve the above-mentioned problems and facilitates the management of the attachment file attached to the electronic mail by providing the user with information on the relationship between the attachment file and the text of the electronic mail with the attachment file attached. Also, embodiments of this invention provide the attachment file information on the attachment file in such a format that it is easy for the user to understand intuitively.

SUMMARY OF THE INVENTION

In order to accomplish the above, the present invention is achieved by an electronic mail display program product for displaying an electronic mail, in which the electronic mail display program product is executed on a client apparatus that receives the mail. The electronic mail display program product includes a program storage device readable by the client apparatus, and a program of instructions tangibly embodied on the program storage device and executable by the client apparatus to perform method steps for displaying an electronic mail. The method steps comprises acquiring attachment position information indicating the attachment position in a text of the electronic mail for an attachment file of the received electronic mail, storing the acquired attachment position information associated with a corresponding identifier of the electronic mail, and arranging a graphic representing the attachment file of the electronic mail on a child screen for displaying a reduced screen of a parent screen for displaying the electronic mail based on the corresponding attachment position information and displaying the child screen together with the parent screen.

The attachment position information is acquired from a mail server that stores the electronic mail addressed to the computer. Also, preferably, the attachment position information includes the number of characters and the number of line feeds from the text head of the electronic mail to the attachment position of the attachment file.

Also, the method further comprises acquiring the attribute information regarding the attachment file for the attachment file of the received electronic mail. And the graphic representing the attachment file of the electronic mail is different depending on the attribute information of the attachment file. The attribute information includes a file type and a file size of the attachment file.

Also, the attribute information includes the attached state information indicating an attached state of the attachment file. And the electronic mail display program product further enables the client apparatus to update the attached state information included in the attribute information of the attachment file from an attached state to a deleted state in response to a delete instruction for deleting the attachment file from a user of the client apparatus.

Also, the attribute information includes the number of accesses to the attachment file. And the electronic mail display program product further enables the client apparatus to increment the number of accesses included in the attribute information of the attachment file in response to an execution instruction for the attachment file from the user of the client apparatus.

Also, the attribute information includes the number of edits of the attachment file. And the electronic mail display program product further enables the client apparatus to increment the number of edits included in the attribute information of the attachment file in response to an edit instruction for the attachment file from the user of the client apparatus.

Also, the electronic mail display program product further enables the client apparatus to prompt the user of the client apparatus to select a process for the attachment file corresponding to the selected graphic from among display, edit, store and delete in response to a selection instruction for the graphic on the child screen from the user of the client apparatus.

Also, the electronic mail display program product further enables the client apparatus to detect a state where a cursor is located on the child screen, and display in up scale the child screen near the position of the cursor in response to the detection.

Also, the electronic mail display program product further enables the client apparatus to detect a state where the cursor is put on the graphic on the child screen, and display the attribute information of the attachment file corresponding to the graphic on which the cursor is put near the cursor in response to the detection.

Also, the electronic mail is a batch of one series of electronic mails that are repeatedly transferred or replied.

Also, the parent screen has a scroll function, and the child screen displays in down scale the entire text of the electronic mail.

In order to accomplish the above, the invention is also achieved by an electronic mail display program product for displaying an electronic mail, in which the electronic mail display program product is executed on a mail server system. The electronic mail display program product includes a program storage device readable by a mail server, and a program of instructions tangibly embodied on the program storage device and executable by the mail server to perform method steps for displaying an electronic mail. The method steps comprises acquiring attachment position information indicating the attachment position in a text of the electronic mail for an attachment file of the received electronic mail, extracting the attachment file from the electronic mail and storing the extracted attachment file in an attachment file storage device, embedding storage location information indicating a storage location of the attachment file at an attachment position of the attachment file for the electronic mail, storing the electronic mail into which the storage location information of the attachment file is embedded in a corresponding mail box, based on the destination information, storing the attachment position information associated with the storage location information and an identifier of the electronic mail in an attachment file information storage device, and transmitting the electronic mail stored in the corresponding mail box together with the corresponding attachment position information to a client apparatus in response to a reception request for the electronic mail from the client apparatus.

The method further comprises acquiring attribute information of the attachment file of the received electronic mail, storing the acquired attribute information in the attachment file information storage device, performing a process in accordance with the contents of a request in response to the request from the client apparatus including the storage location information of the attachment file, and updating the attribute information of the corresponding attachment file in accordance with the process that is performed.

Further, the electronic mail is a batch of one series of electronic mails that are repeatedly transferred or replied, and transmitting the electronic mail to the client apparatus includes transmitting the electronic mail together with the corresponding attachment position information and the attribute information after update to the client apparatus.

The embodiments of this invention have been described above as the electronic mail display program product executed on each of the client apparatus and the mail server system. However, the invention can be also grasped as an electronic mail display device that is embodied by running such electronic mail display program product on the client apparatus. Further, the invention can be also grasped as a method for displaying the electronic mail on the client apparatus.

With the invention, since the attachment position information of the attachment file attached to the electronic mail text is provided to the user, the user can know the relationship between the attachment file and the text of the electronic mail to which the attachment file is attached, whereby the management of the attachment file is facilitated. Further, with the invention, since the child screen that displays in down scale the text of the electronic mail on which the graphic representing the attachment file is arranged at the appropriate position is provided, the user can understand intuitively the relationship between the attachment file and the text of the electronic mail to which the attachment file is attached.

BRIEF DESCRIPTION OF THE DRAWINGS

FIG. 3 is a view showing one example of a table stored in an attachment file viewer database according to the first embodiment of the invention;

FIG. 12A is a view showing one example of a table stored in an attachment file information storage device according to the second embodiment of the invention, and FIG. 12B is a view showing another example of the table stored in the attachment file information storage device according to the second embodiment of the invention;

FIG. 13A is a view showing one example of a table stored in an attachment file viewer database according to the second embodiment of the invention, and FIG. 13B is a view showing another example of the table stored in the attachment file viewer database according to the second embodiment of the invention;

DETAILED DESCRIPTION OF THE PREFERRED EMBODIMENTS

Figure 1:
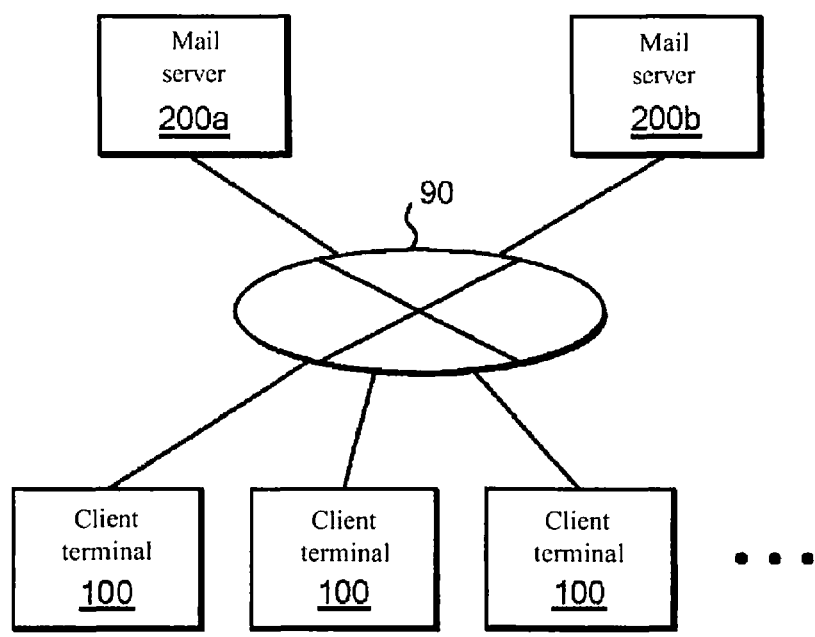
FIG. 1 is a view showing one example of the overall configuration of an electronic mail display system according to a first embodiment of the present invention.

The best mode for carrying out the present invention will be described below in detail with reference to the drawings. The following embodiments do not limit the invention as defined in the claims, and all the combinations of features as described in the embodiments are not necessarily requisite to solving means of the invention. The same parts are designated by the same reference numerals throughout the description of the embodiments.

FIG. 1 is a view showing the overall configuration of an electronic mail information display system according to a first embodiment of the invention. The system comprises the mail servers 200a and 200b, connected to a network 90 such as the Internet or LAN (Local Area Network), for providing a transmitting and receiving service of the electronic mail to a plurality of client apparatuses 100, and the plurality of client apparatuses 100, connected to the network 90, for exchanging the electronic mail with each other, using the service provided by the mail servers 200a and 200b.

A client apparatus 100 that transmits an electronic mail transmits the created electronic mail to a mail server 200a with which it is registered, using an SMTP (Simple Mail Transfer Protocol).

The mail server 200a receives the electronic mail from the registered client apparatus 100, and then transfers the received mail to a mail server 200b that manages the electronic mail addressed to a destination address of the electronic mail, using the SMTP.

The mail server 200b receives the electronic mail from the mail server 200a, and then stores the electronic mail in a mail box prepared for each address of the electronic mail. If the electronic mail is the electronic mail with an attachment file, the mail server 200b according to the invention calculates the attachment position information in an electronic mail text of the attachment file. And the mail server 200b stores the attachment position information as a part of the attachment file information associated with the electronic mail.

The mail server 200b receives an access request from the registered client apparatus 100, and then authenticates the client apparatus 100, using a POP3 (Post Office Protocol Version 3). And the mail server 200b transfers the requested electronic mail, together with the attachment file information if there is an attachment file, to the client apparatus 100, on the condition that the authentication is successful.

The client apparatus 100 receiving the electronic mail gains access to the mail server 200b with which it is registered, and makes a request for receiving a list of electronic mails addressed to itself or the electronic mail. In receiving the electronic mail with an attachment file, the client apparatus 100 according to the invention also receives the corresponding attachment file information. And the client apparatus 100 assigns an identifier to the received attachment file information and registers the attachment file information in a table, associated with the identifier and the corresponding Message-ID of the electronic mail.

The client apparatus 100 reads the corresponding attachment file information from the table, when displaying the electronic mail with attachment file in response to a user's instruction of the client apparatus 100 as one example. And the client apparatus 100 arranges a graphic representing the attachment file of the electronic mail on a child screen that displays the reduced screen of a parent screen displaying the electronic mail, based on the attachment position information included in the corresponding attachment file information, and displays the child screen together with the parent screen. The parent screen may be an electronic mail display screen for the electronic mail client having a scroll function, and the child screen may display in down scale the entire text of the electronic mail.

The user of the client apparatus 100 according to the invention can grasp the attachment position of the attachment file in the electronic mail text from the display position of the graphic representing the attachment file displayed on the child screen and know the relationship between the attachment file and the text of the electronic mail to which the attachment file is attached. For example, when a plurality of addresses are designated as the destinations of the electronic mail, the electronic mail text may often include the message addressed to the recipient and the message addressed to any other party than the recipient. In such a case, the attachment file attached near the message addressed to itself is relevant to itself at very high possibility, while the attachment file attached near the message addressed to the other party is irrelevant to itself at high possibility.

Also, when the received electronic mail is a batch of one series of electronic mails that are repeatedly transferred or returned, some of the previous electronic mails may be irrelevant to the recipient. And there is high possibility that the attachment file attached to the text part of the electronic mail directly irrelevant is also irrelevant to the recipient.

In this way, according to the invention, since the attachment position information of the attachment file attached in the electronic mail text is provided to the user, the user can know the relationship between the attachment file and the text of the electronic mail to which the attachment file is attached from the attachment position information, and make the management of the attachment file more easily. Further, according to the invention, since the child screen on which the graphic representing the attachment file is arranged at an appropriate position is provided, the user can understand intuitively and quickly the relationship between the attachment file and the text of the electronic mail to which the attachment file is attached.

Figure 2:
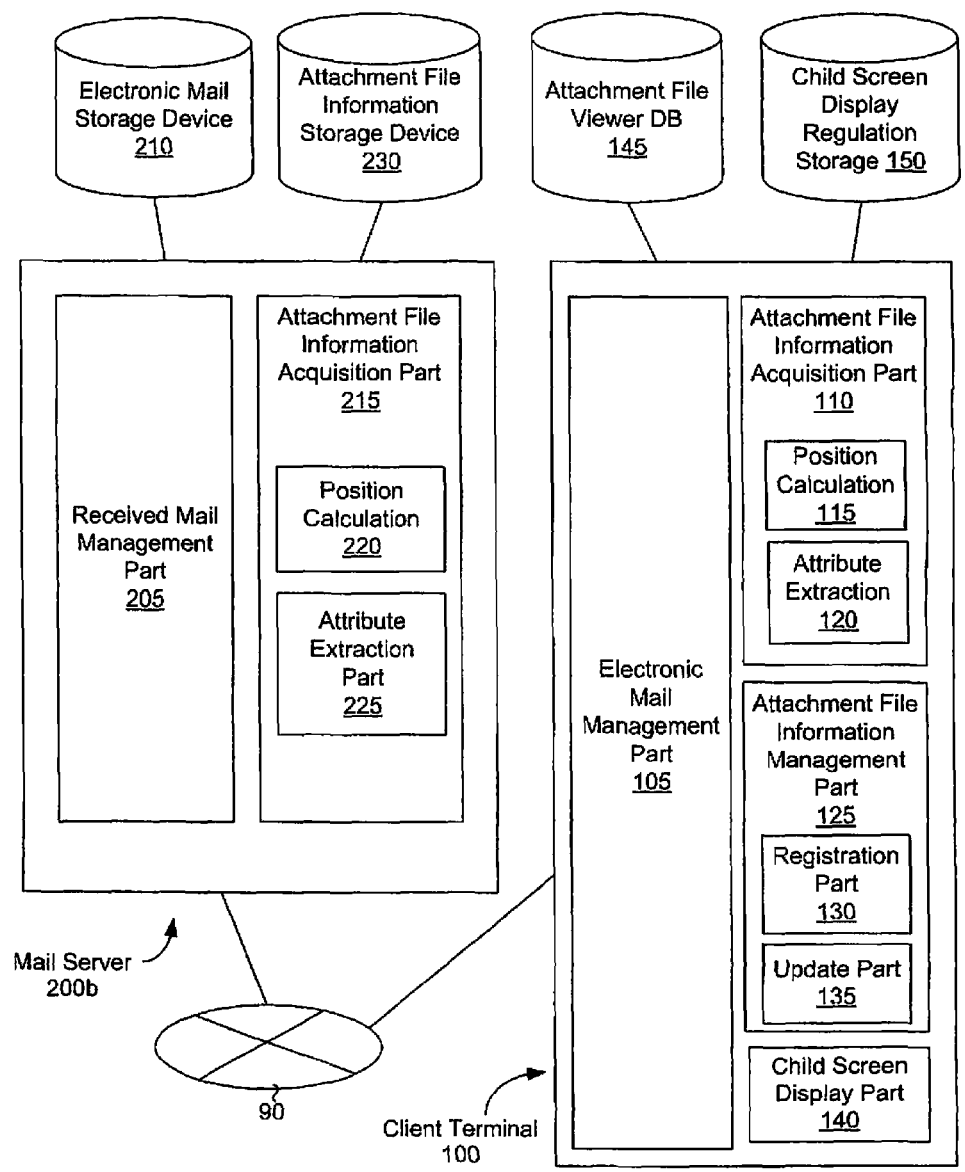
FIG. 2 is a view showing one example of the functional configuration of a client apparatus 100 and a mail server 200*b* according to the first embodiment of the invention.

FIG. 2 is a view showing one example of the functional configuration of the mail server 200b and the client apparatus 100 according to the first embodiment of the invention. The mail server 200b according to the first embodiment comprises a received mail management part 205, an electronic mail storage device 210, an attachment file information acquisition part 215, and an attachment file information storage device 230.

The electronic mail storage device 210 comprises a plurality of mail boxes corresponding to the mail addresses of a plurality of client apparatuses 100 registered with the mail server 200b.

The received mail management part 205 has a conventional mail server function of receiving the electronic mail addressed to the registered client apparatus 100 from the mail server 200a and storing the received electronic mail in the corresponding mail box of the electronic mail storage device 210. When there is a file attached to the electronic mail, the received mail management part 205 according to the invention once passes the file to the attachment file information acquisition part 215, before storing the file in the mail box.

The attachment file information acquisition part 215 comprises a position calculation part 220 and an attribute extraction part 225, and acquires the attachment file information on the attachment file from the electronic mail if receiving the electronic mail with attachment file from the received mail management part 205.

Figure 4:
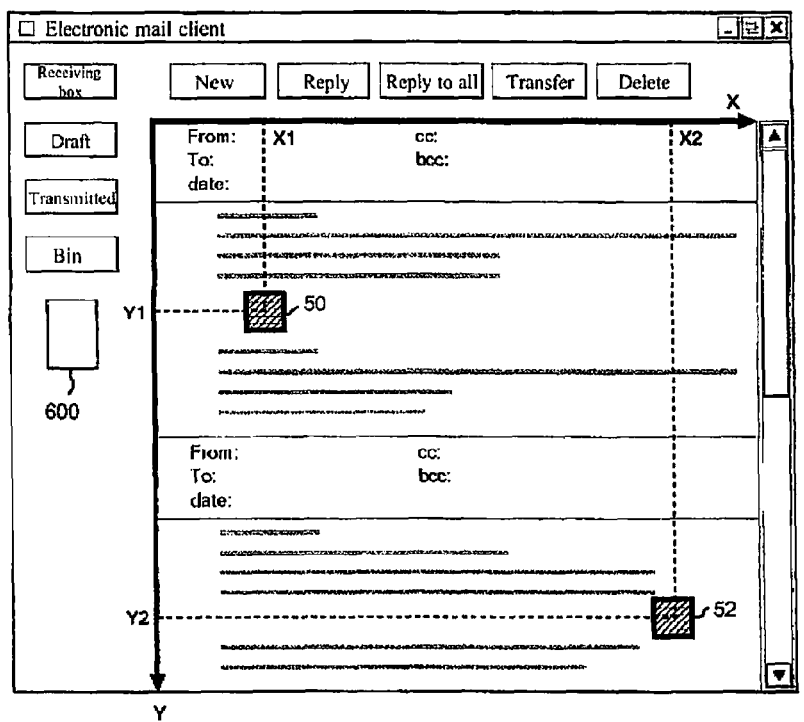
FIG. 4 is a view showing one example of a screen display of an electronic mail with attachment file by an electronic mail client.

Herein, the attachment position information of the attachment file means the position information of an icon or inline display for the attachment file on an electronic mail display window of the electronic mail client operating on the client apparatus 100. For example, in an instance of the electronic mail display window of the electronic mail client as shown in FIG. 4, the attachment position information of the attachment file as indicated by the icon 50 is (X1, Y1), and the attachment position information of the attachment file as indicated by the icon 52 is (X2, Y2). The attachment position information (X, Y) can be represented with the row and the column in the electronic mail text. As one example, the attachment position information (X, Y) may be represented as the number of characters and the number of line feeds from the head of the text of the electronic mail to the attachment position of the attachment file. The size of the electronic mail display window is fixed, or a default value.

Also, the attribute extraction part 225 extracts the attribute information of the attachment file except for the attachment position information from the electronic mail. The attribute extraction part 225 in this embodiment extracts, as the attribute information, the message identifier and title of the electronic mail to which the attachment file is attached, the file name, file type and file size of the attachment file. As one example, in the electronic mail in accordance with an MIME (Multipurpose Internet Mail Extension) specification, the former attribute information can be extracted from the header part (Message-ID field value and Subject field value) of the electronic mail, and the latter attribute information can be extracted from the header part (Content-Type field value and name value) and the main part of the attachment file separated by a delimiter statement in the message main part.

The information acquired by the position calculation part 220 and the attribute extraction part 225 is stored as the attachment file information, associated with the corresponding electronic mail, in the attachment file information storage device 230. And the received mail management part 205, like the conventional mail server, reads the electronic mail from the corresponding mail box and transfers it to the client apparatus 100, if receiving a request for mail reception from the authenticated client apparatus 100. When there is a file attached to the electronic mail, the received mail management part 205 according to the invention reads the corresponding attachment file information from the attachment file information storage device 230 and transfers it together with the electronic mail to the client apparatus 100.

Next, the client apparatus 100 according to the first embodiment comprises an electronic mail management part 105, an attachment file information acquisition part 110, an attachment file information management part 125, a child screen display part 140, an attachment file viewer database 145 and a child screen display regulation storage device 150.

The electronic mail management part 105 has the conventional electronic mail client function and performs a series of processes including creating, sending and receiving, and displaying the electronic mail in response to a user's instruction of the client apparatus 100. In receiving the electronic mail with attachment file from the mail server 200b, the electronic mail management part 105 according to the invention receives the corresponding attachment file together with the electronic mail, and passes it to the attachment file information acquisition part 110, as will be described later.

Also, if a display instruction for the electronic mail with attachment file is made by the user of the client apparatus 100, the electronic mail management part 105 according to the invention notifies the instruction together with the identifier (Message-ID) of the selected electronic mail to the child screen display part 140. Furthermore, if the attachment file is selected by the user of the client apparatus 100, the electronic mail management part 105 displays a selection window including the display, edit, store and delete buttons to prompt the user to select a process for the attachment file. And the electronic mail management part 105 notifies the kind of the process selected by the user together with the identifier (Message-ID) of the electronic mail to which the attachment file is attached to the attachment file information management part 125, as will be described later.

If the electronic mail with attachment file is received in the client apparatus 100, the attachment file information acquisition part 110 acquires the attachment file information from the electronic mail management part 105. As the position calculation part 115 and the attribute extraction part 120 are indicated by the dotted line in FIG. 2, the attachment file information acquisition part 110 has the functions that the attachment file information acquisition part 215 of the mail server 200b has, namely, the position calculation part 220 and the attribute extraction part 225, whereby the attachment file information may be acquired from the electronic mail with attachment file in the client apparatus 100. With such a configuration, it is preferable that if the size of the electronic mail display window (parent screen) is variable, the position calculation part 115 provided in the client apparatus 100 receives a notification that the size of the electronic mail display window (parent screen) is changed by the user, and the attachment position information (X, Y) is calculated every time. In any case, the attachment file information acquisition part 110 further passes the acquired attachment file information to the attachment file information management part 125.

The attachment file information management part 125 comprises a registration part 130 and an update part 135, and receives and manages the attachment file information from the attachment file information acquisition part 110. That is, the registration part 130, upon receiving the attachment file information from the attachment file information acquisition part 110, appends an identifier (AIV-ID: Attachment Information Viewer Identifier) for uniquely identifying the attachment file information in the client apparatus 100 to it, and registers the attachment file information associated with the AIV-ID and the corresponding identifier of the electronic mail in the attachment file viewer database 145.

FIG. 3 shows one example of a table in the attachment file viewer database 145. The table includes the columns of the AIV-ID, Message-ID, Subject, attachment file name, attachment file position, attachment file type, attachment file size, and attachment file states, as shown in FIG. 3. The registration part 130 registers the AIV-ID in a column of the AIV-ID. As shown in FIG. 3, the AIV-ID is decided by the Message-ID, Subject, and attachment file name in this embodiment. Also, the registration part 130 registers the Message-ID that is the message identifier and the value of Subject that is the title for the electronic mail to which the attachment file is attached in the columns of Message-ID and Subject.

Further, the registration part 130 registers the values acquired by the attribute extraction part 225 of the mail server 200b and included in the attachment file information in the columns of the attachment file name, attachment file type, and attachment file size. Similarly, the registration part 130 registers the value calculated by the position calculation part 220 of the mail server 200b and included in the attachment file information in the column of the attachment file position.

The registration part 130 also registers the information indicating the states of attachment file in the columns of the attachment file states. In this embodiment, the states of the attachment file include the number of accesses to the attachment file in the client apparatus 100, the deleted state of the attachment file and the number of edits of the attachment file, as shown in FIG. 3. The registration part 130 registers the initial values in the columns of the states of attachment file in registering the attachment file information in the attachment file viewer database 145 for the first time. Herein, the initial values of the number of accesses and the number of edits are 0, and the initial value of the deleted state is the value indicating NO.

As described above, when the attachment file is selected by the user of the client apparatus 100, the attachment file information management part 125, namely, the update part 135 receives a notification of the kind of process for the attachment file together with the Message-ID from the electronic mail management part 105, or the child screen display part 140, as will be described later. And if the kind of process is "display", the update part 135 reads the value of the number of accesses for the attachment file information having the Message-ID coincident with the received Message-ID from the attachment file viewer database 145, and increments it by one. Similarly, if the kind of process is "edit", the update part 135 reads the value of the number of edits for the attachment file information having the Message-ID coincident with the received Message-ID from the attachment file viewer database 145, and increments it by one. Furthermore, if the kind of process is "delete", the update part 135 reads the value of the deleted state for the attachment file information having the Message-ID coincident with the received Message-ID from the attachment file viewer database 145, and updates it with the value indicating YES.

The child screen display part 140, on receiving a notification of a display instruction for the electronic mail together with the Message-ID of the electronic mail from the electronic mail management part 105, displays a child screen displaying in down scale the entire text of the electronic mail on the display screen of the client apparatus 100. This child screen may be displayed together with an electronic mail display window (hereinafter referred to as a parent screen) having a scroll function as shown in FIG. 4 and displayed and managed by the electronic mail management part 105. The reduction ratio of the electronic mail text is preferably the value at which the entire text of the electronic mail is displayed on the child screen of a predetermined size without the scroll function, and preferably dynamically changed according to the length of the text of the electronic mail.

In displaying the child screen for the electronic mail with attachment file, the child screen display part 140 reads the attachment file information having the Message-ID coincident with the Message-ID of the displayed electronic mail from the attachment file viewer database 145. And the child screen display part 140 decides a graphic representing the attachment file in accordance with the child screen display regulation stored in the child screen display regulation storage device 145, and arranges and displays the decided graphic at an appropriate position on the child screen, based on the attachment position information included in the attachment file information.

The child screen display part 140 also displays a selection window including the display, edit, store and delete buttons to prompt the user to select a process for the attachment file in response to a selection instruction of the graphic on the child screen from the user of the client apparatus 100. And the child screen display part 140 notifies the kind of process selected by the user together with the identifier (Message-ID) of the electronic mail to which the attachment file is attached to the attachment file information management part 125.

The child screen display part 140 preferably detects the state where the cursor is located on the child screen, and displays in up scale the child screen near the position of the cursor in response to the detection. With this function, even if any character in the electronic mail text is illegible on the child screen, the user can know the contents of the electronic mail text near the cursor by moving the cursor nearer to it. The child screen display part 140 also detects the state where the cursor is put on the graphic on the child screen, and displays the attachment file information of the attachment file corresponding to the graphic on which the cursor is put near the cursor in response to the detection. The displayed attachment file information may include the attachment file name, attachment file size, and detailed information of the attachment file states, namely, the number of accesses and the number of edits, as one example.

The child screen display regulation storage device 145 stores the child screen display regulation for deciding the graphic representing the attachment file, which is displayed on the child screen. The child screen display regulation for use is preferably the regulation of deciding the different graphic depending on the type of attachment file, size of attachment file and states of attachment file. As one example, the child screen display regulation may decide the shape and color of graphic according to the type of attachment file, and decide the hue of color according to the size of attachment file. Furthermore, as one example, the child screen display regulation may decide the thickness of the contour for the graphic according to the number of accesses to the attachment file, decide the kind of the contour for the graphic according to the deleted state of the attachment file, and decide the ornament of the contour for the graphic according to the number of edits of the attachment file.

Figure 5:
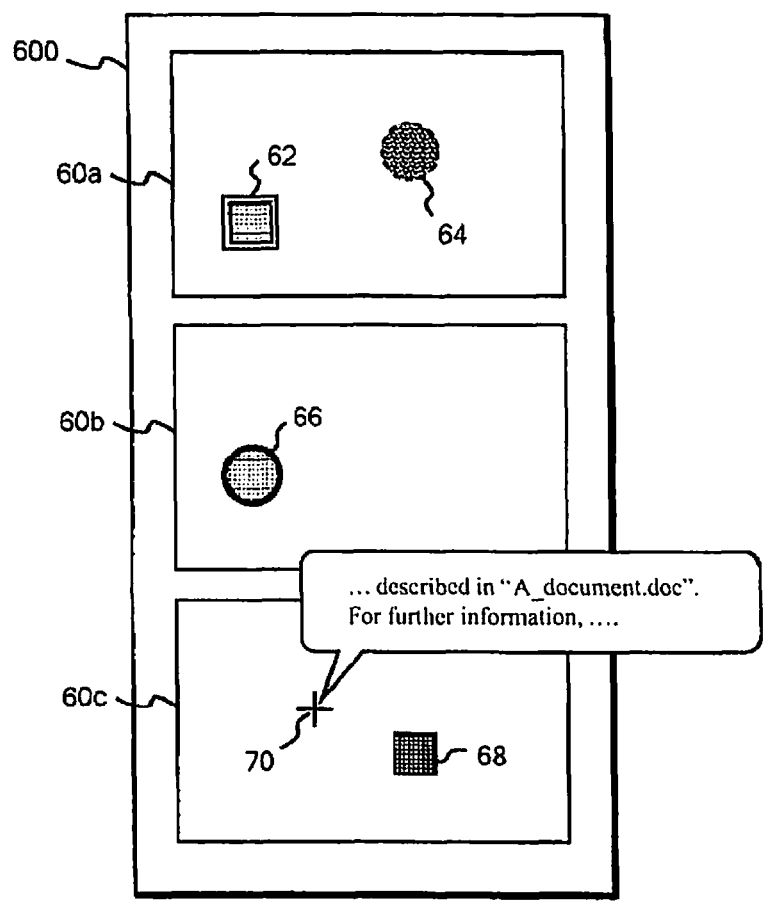
FIG. 5 is a view showing one example of a child screen for displaying in down scale the entire text of the electronic mail with attachment file according to the embodiment of the invention.

FIG. 5 shows one example of a child screen 600 that is displayed on the display screen of the client apparatus 100 by the child screen display part 140. Herein, it is supposed that the electronic mail of which the text is displayed in down scale on the child screen 600 is a batch of one series of electronic mails which are repeatedly transferred or returned, and includes an electronic mail 60*a* newly written at this time and the previous electronic mails 60*b* and 60*c* that are transferred or returned. Also, it is supposed that a document file 62 and an image file 64 are attached to the electronic mail 60*a*, an image file 66 is attached to an electronic mail 60*b*, and a document file 68 is attached to an electronic mail 60*c*.

Each graphic representing the attachment file is arranged and displayed at an appropriate position on the child screen, based on the attachment position information of the corresponding attachment file, as shown in FIG. 5. As a result, the user of the client apparatus 100 can understand the relationship between the electronic mail text and the attachment file only by looking at the child screen. Also, if a cursor 70 is moved on the child screen, the contents of the electronic mail text near the cursor are displayed in up scale, whereby the user can confirm the contents, as shown in FIG. 5. The child screen 600 may be displayed together with the window of the electronic mail client that is the parent screen, as shown in FIG. 4.

In an example as shown in FIG. 5, the document file is represented in rectangle and red (see the graphics 62 and 68), and the image file is represented in circle and light blue (see the graphics 64 and 66). Furthermore, in the example as shown in FIG. 5, it is indicated that the attachment file is deleted by the broken line contour of the graphic (see the graphic 64), it is indicated that the number of edits of the attachment file is great by the double line contour of the graphic (see the graphic 62), and it is indicated that the number of accesses is great by the thick line contour of the graphic (see the graphic 66). Accordingly, the user of the client apparatus 100 can know the file type of the corresponding attachment file, size of the file, and states of the file at once from the graphic in this embodiment. An AIV (Attachment Information Viewer) flag may be prepared to turn ON or OFF the functions of the attachment file information acquisition part 110, the attachment file information management part 125 and the child screen display part 140 in accordance with an instruction of the user.

Figure 6:
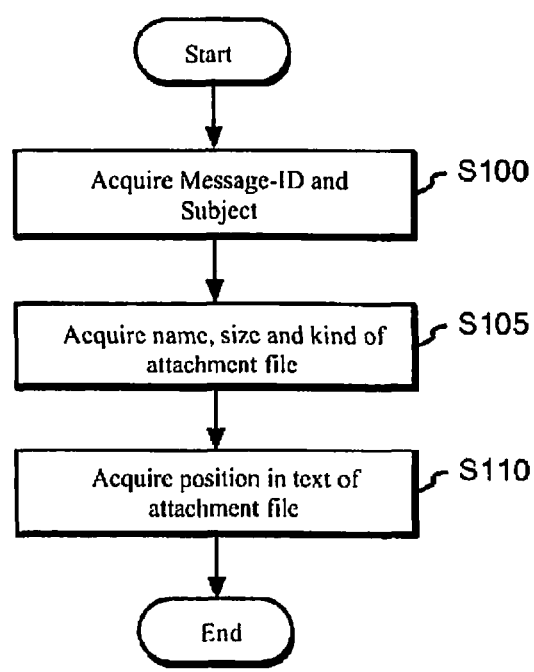
FIG. 6 is a flowchart showing one example of the flow of an attachment file information acquisition process according to the embodiment of the invention.

Referring to FIGS. 6 to 9, the flow of a process for displaying the attachment file information according to the first embodiment of the invention will be described below. In the following description, it is supposed that a process for acquiring the attachment file information from the electronic mail with attachment file is performed in the mail server 200*b*. However, it is noted that this process can be performed in the client apparatus 100 as described above. FIG. 6 is a flowchart showing one example of the flow of the attachment file information acquisition process in the mail server 200*b*. In FIG. 6, the process starts at step 100, where the mail server 200*b* takes the Message-ID and Subject out of the header part of the electronic mail with attachment file.

Next, the mail server 200*b* acquires the file name and file type of the attachment file from the header part of the attachment file separated by the delimiter statement in the message main part of the electronic mail, and similarly acquires the file size of the attachment file from the main body part of the attachment file separated by the delimiter statement (step 105).

Lastly, the mail server 200*b* acquires the attachment position information (X,Y) of the attachment file in the electronic mail text by counting the number of characters and the number of line feeds from the text head of the electronic mail to the attachment position of the attachment file (step 110). And the process is ended. The processings from step 100 to step 110 may be performed in a different sequence from the sequence as described above.

Figure 7:
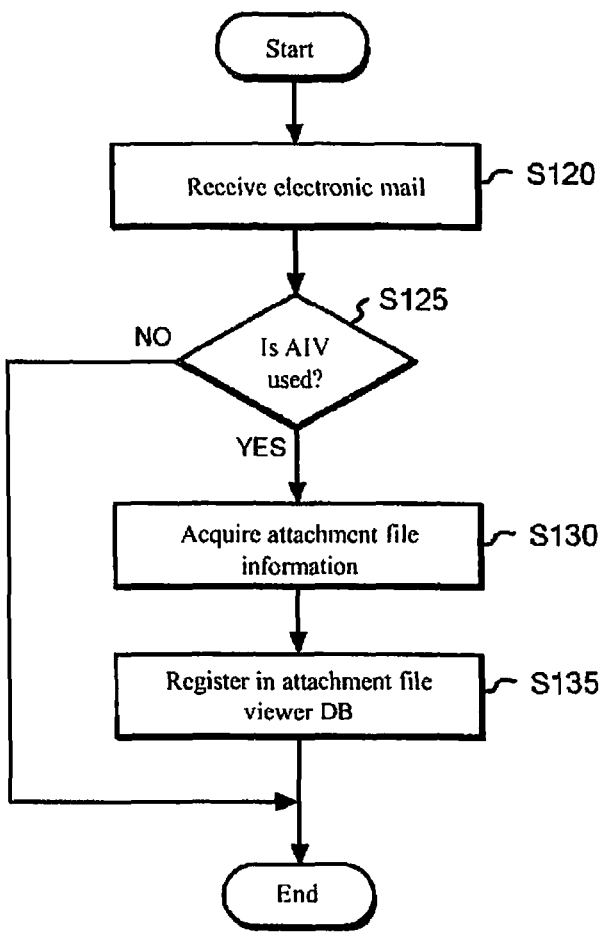
FIG. 7 is a flowchart showing one example of the flow of an attachment file information registration process according to the first embodiment of the invention.

FIG. 7 is a flowchart showing one example of the flow of an attachment file information registration process in the client apparatus 100. The process as shown in FIG. 7 starts when an electronic mail client on the client apparatus 100 is activated and the electronic mail client sends a request for electronic mail reception to the mail server 200*b*. In FIG. 7, the process starts at step 120, where the client apparatus 100 gains access to the mail server 200*b* with which it is registered and receives the electronic mail. Next, the client apparatus 100 judges whether or not the attachment file information display function is usable by seeing the AIV flag (step 125). If the AIV flag indicates OFF (step 125: NO), the process is ended.

On the other hand, if the AIV flag indicates ON (step 125: YES), the process goes to step S130, where the client apparatus 100 receives the attachment file information corresponding to the received electronic mail from the mail server 200*b*. And the client apparatus 100 registers the received attachment file information in the attachment file viewer database (step 135). And the process is ended.

Figure 8:
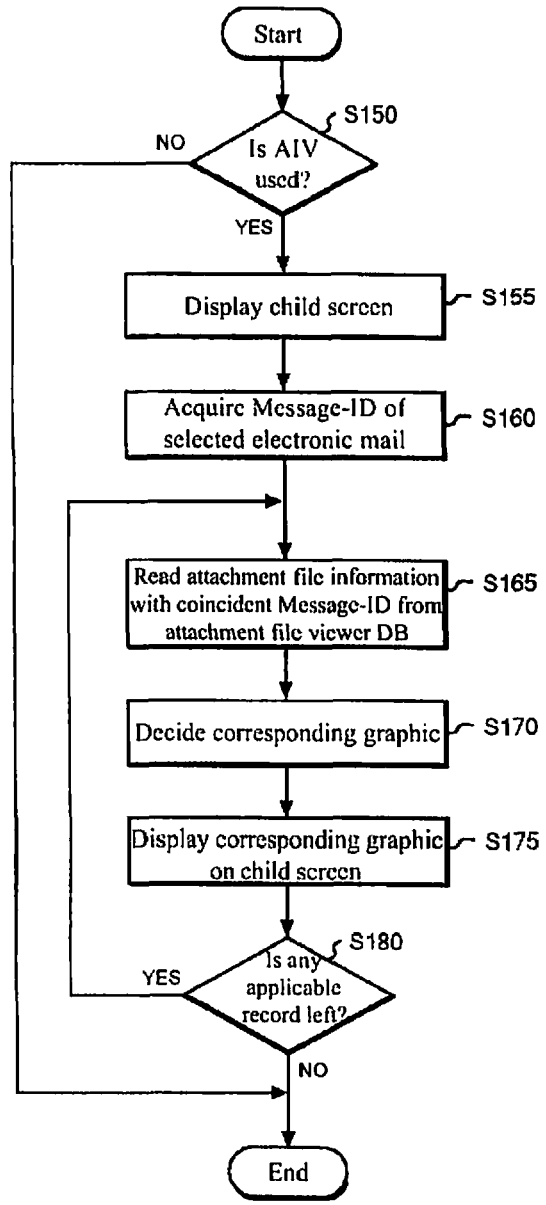
FIG. 8 is a flowchart showing one example of the flow of an attachment file information display process according to the embodiment of the invention.

FIG. 8 is a flowchart showing one example of the flow of an attachment file information display process in the client apparatus 100. The process as shown in FIG. 8 starts when the user makes an instruction for displaying the electronic mail selected by the user to the electronic mail client operating on the client apparatus 100. In FIG. 8, the process starts at step 150, where the client apparatus 100 judges whether or not the attachment file information display function is usable by seeing the AIV flag (step 150). If the AIV flag indicates OFF (step 150: NO), the process is ended.

On the other hand, if the AIV flag indicates ON (step 150: YES), the process goes to step S155, where the client apparatus 100 displays the child screen for displaying in down scale the entire text of the selected electronic mail together with the parent screen of the electronic mail client having the scroll function on the display screen of the client apparatus 100. Next, the client apparatus 100 acquires the Message-ID of the electronic mail selected to display (step 160), and reads one attachment file information including the Message-ID coincident with the acquired Message-ID from the attachment file viewer database 145 (step 165).

Further, the client apparatus 100 decides a graphic representing the attachment file by converting each information included in the read attachment file information into graphic information in accordance with the child screen display regulation stored in the child screen display regulation storage device 150 (step 170). And the client apparatus 100 arranges the decided graphic at an appropriate position and displays it on the child screen, based on the attachment position information included in the read attachment file information (step 175).

Thereafter, the client apparatus 100 judges whether or not the attachment file information including the Message-ID coincident with the acquired Message-ID is still present in the attachment file viewer database 145 (step 180). If the attachment file information still remains (step 180: YES), the process returns to step 165, whereby a series of steps from step 170 to step 180 are repeated. If the attachment file information does not remain (step 180: NO), the process is ended.

Figure 9:
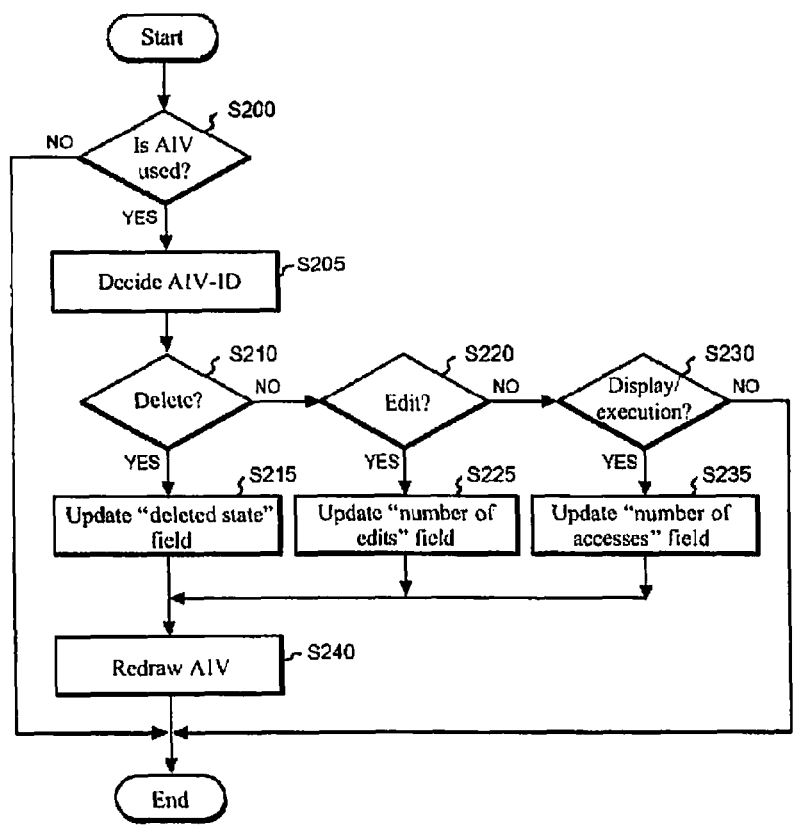
FIG. 9 is a flowchart showing one example of the flow of an attachment file information update process according to the embodiment of the invention.

FIG. 9 is a flowchart showing one example of the flow of an attachment file information update process in the client apparatus 100. The process as shown in FIG. 9 starts when there is a user's selection instruction for the attachment file inputted into the parent screen or child screen displayed on the display screen of the client apparatus 100, and a selection window including the display, edit, store and delete buttons appears to prompt the user to select the process for the attachment file. In FIG. 9, the process starts at step 200, where the client apparatus 100 judges whether or not the attachment file information display function is usable by seeing the AIV flag. If the AIV flag indicates OFF (step 200: NO), the process is ended.

On the other hand, if the AIV flag indicates ON (step 200: YES), the process goes to step S205, where the client apparatus 100 decides the AIV-ID from the file name of the selected attachment file and the Message-ID and Subject of the electronic mail to which the attachment file is attached (step 205). Next, the client apparatus 100 judges whether or not the process for the attachment file is "delete" (step 210). If the process is "delete" (step 210: YES), the client apparatus 100 updates the value in the column of the deleted state for the attachment file information having the decided AIV-ID to YES (step 215).

On the other hand, if the process is not "delete" (step 210: NO), the process goes to step 220, where the client apparatus 100 judges whether or not the process for the attachment file is "edit". If the process is "edit" (step 210: YES), the client apparatus 100 increments by one the value in the column of the number of edits of the attachment file information having the decided AIV-ID (step 225). On the other hand, if the process is not "edit" (step 220: NO), the process goes to step 230, where the client apparatus 100 judges whether or not the process for the attachment file is "display/execution".

If the process is "display/execution" (step 230: YES), the client apparatus 100 increments by one the value in the column of the number of accesses to the attachment file information having the decided AIV-ID (step 235). On the other hand, if the process is not "display/execution" (step 230: NO), the process is ended. The process goes from steps 215, 225 and 235 to step 240, where the client apparatus 100 redraws the child screen based on the attachment file information after update, and the process is ended.

Figure 10:
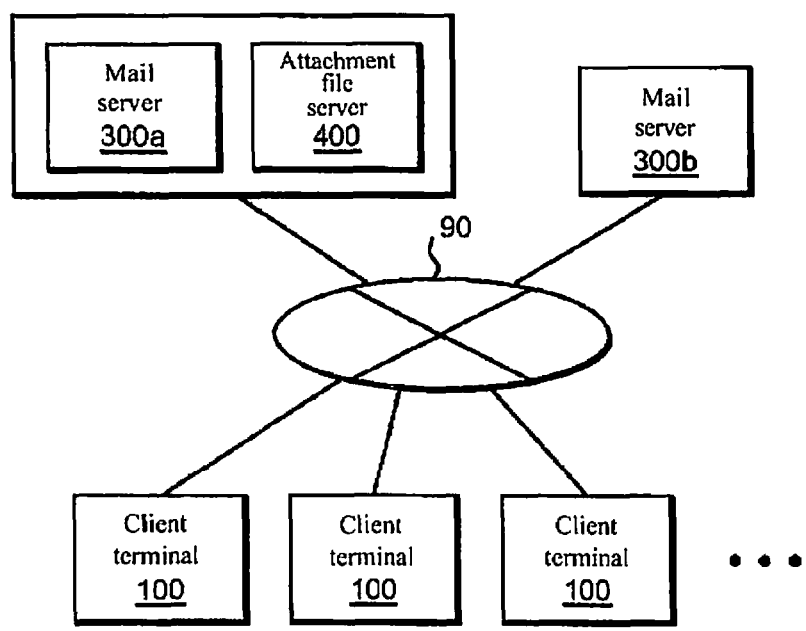
FIG. 10 is a view showing one example of the overall configuration of an electronic mail display system according to a second embodiment of the invention.

In the first embodiment, the invention has been described above with a case where the attachment file is directly attached to the electronic mail. Thus, in a second embodiment of the invention, the invention will be described below with a case where the attachment file is attached in a calling form. FIG. 10 is a view showing the overall configuration of an electronic mail display system according to the second embodiment of the invention. The system comprises the mail servers 300a and 300b and an attachment file server 400, connected to a network 90 such as the Internet or LAN (Local Area Network), for providing a transmitting and receiving service of the electronic mail to a plurality of client apparatuses 100, and the plurality of client apparatuses 100, connected to the network 90, for exchanging the electronic mail with each other, using the service provided by the mail servers 300a and 300b and the attachment file server 400.

A client apparatus 100 that transmits an electronic mail transmits the created electronic mail to a mail server 300a with which it is registered, using an SMTP (Simple Mail Transfer Protocol).

The mail server 300a according to the invention receives the electronic mail from the registered client apparatus 100, and then judges whether or not the attachment file is attached to the electronic mail. If the attachment file is attached, the mail server 300a calculates the attachment position information of the attachment file in the electronic mail text. Also, if the attachment file satisfies a predetermined condition, for example, if the file size is a predetermined value or greater, the mail server 300a deletes and extracts the attachment file from the electronic mail, and decodes it. And the mail server 300a passes the decoded attachment file to the attachment file server 400.

The attachment file server 400 receives the attachment file, and then stores it at a predetermined storage location, as well as returns the storage location information indicating the storage location to the mail server 300a. Also, the attachment file server 400, upon receiving an access request together with the storage location information from the client apparatus 100 that is a recipient of the electronic mail, transfers the attachment file stored in the storage location indicated by the received storage location information to the client apparatus 100.

The mail server 300a embeds the storage location information received from the attachment file server 400 into the attachment position of the deleted attachment file. And the mail server 300a transfers the received electronic mail directly if the file is not attached, or together with the attachment file information including the attachment position information if the file is attached, to the mail server 300b for managing the electronic mail addressed to the destination address of the electronic mail, using the SMTP.

The mail server 300b receives the electronic mail from the mail server 300a, and then stores the electronic mail in the mail box prepared for each address of the electronic mail. If the file is attached directly or indirectly to the electronic mail, the mail server 300b according to the invention stores the attachment file information including the attachment position information transferred together with the electronic mail associated with the electronic mail.

The mail server 300b receives an access request from the registered client apparatus 100, and authenticates the client apparatus 100, using a POP3 (Post Office Protocol Version 3). And the mail server 300b transfers the requested electronic mail, together with the attachment file information if the file is attached directly or indirectly to the electronic mail, to the client apparatus 100, on the condition that the authentication is successful.

The client apparatus 100 receiving the electronic mail gains access to the mail server 300b with which it is registered, and makes a request for receiving a list of electronic mails addressed to itself or the electronic mail. The client apparatus 100 according to the invention receives the corresponding attachment file information together with the electronic mail, if the file is attached directly or indirectly to the electronic mail. And the client apparatus 100 assigns an identifier to the received attachment file information and registers the attachment file information in a table, associated with the identifier and the corresponding Message-ID of the electronic mail.

The client apparatus 100 reads the corresponding attachment file information from the table in displaying directly or indirectly the electronic mail with attachment file in response to a user's instruction of the client apparatus 100 as one example. And the client apparatus 100 arranges a graphic representing the attachment file of the electronic mail on a child screen that displays the reduced screen of a parent screen displaying the electronic mail, based on the attachment position information included in the corresponding attachment file information, and displays the child screen together with the parent screen. The parent screen may have a scroll function, and the child screen may display in down scale the entire text of the electronic mail.

If the attachment file is attached to the electronic mail in a calling form, that is, the storage location information indicating the storage location of the attachment file is included in the text of electronic mail, the user of the client apparatus 100 gains access to the attachment file server 400, and makes a request for the attachment file stored in the storage location indicated by the storage location information.

In this way, according to the second embodiment, the attachment files satisfying a predetermined condition, or all the attachment files, are deleted from the electronic mail in the mail server 300a, and stored in the attachment file server 400. Thus, in the second embodiment, the attachment file information including the attachment position information of the attachment file is acquired from the electronic mail in the local mail server 300a for the client apparatus 100 that transmits the electronic mail to acquire the attachment position information in the electronic mail text of the attachment file before the attachment file is deleted from the electronic mail.

Figure 11:
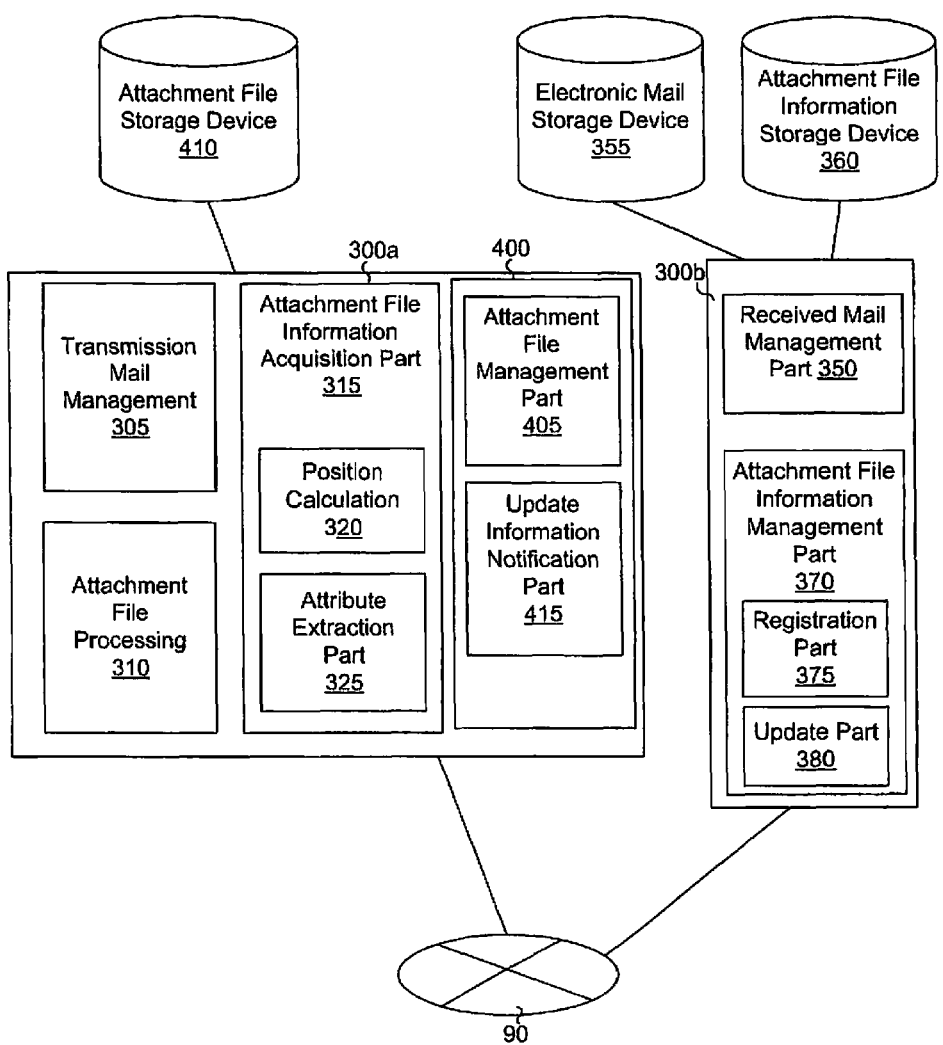
FIG. 11 is a view showing one example of the functional configuration of the mail servers 300a and 300b and an attachment file server 400 according to the second embodiment of the invention.

FIG. 11 is a view showing one example of the functional configuration of the mail servers 300a and 300b and the attachment file server 400 according to the second embodiment of the invention. The mail server 300a according to the second embodiment comprises a transmission mail management part 305, an attachment file processing part 310, and an attachment file information acquisition part 315.

The transmission mail management part 305 has a conventional mail server function of receiving the electronic mail from the client apparatus 100 registered in the mail server 300a, and then judging whether or not the electronic mail has the attachment file. If the electronic mail has the attachment file, the transmission mail management part 305 passes it to the attachment file information acquisition part 315. On the other hand, if the electronic mail does not have the attachment file, the transmission mail management part 305 transfers the received mail to the mail server 300b that manages the electronic mail addressed to the destination address of the electronic mail.

The attachment file information acquisition part 315 comprises a position calculation part 320 and an attribute extraction part 325, and acquires the attachment file information on the attachment file from the electronic mail if receiving the electronic mail with attachment file from the transmission mail management part 305. That is, the position calculation part 320 acquires the attachment position information of the attachment file attached in the electronic mail text. Also, the attribute extraction part 325 extracts the attribute information of the attachment file except for the attachment position information from the electronic mail. Since the functions of the position calculation part 320 and the attribute extraction part 325 are the same as described in the first embodiment, the detailed description is omitted here to avoid the repetition. After acquiring the attachment file information from the electronic mail, the attachment file information acquisition part 315 passes the electronic mail to the attachment file processing part 310.

The attachment file processing part 310 judges whether or not for the electronic mail acquired from the attachment file information acquisition part 315, the attachment file satisfies a predetermined condition. The predetermined condition may be the condition regarding the file type or file size of the attachment file as one example. If it is judged that the attachment file does not satisfy the predetermined condition, the attachment file processing part 310 receives the corresponding attachment file information from the attachment file information acquisition part 315, and transfers the attachment file information and the electronic mail to the mail server 300b that manages the electronic mail addressed to the destination address of the electronic mail.

On the other hand, if it is judged that the attachment file satisfies the predetermined condition, the attachment file processing part 310 deletes and extracts the attachment file from the electronic mail, and decodes it. And the attachment file processing part 310 passes the decoded attachment file together with the destination address of the electronic mail to which the attachment file is attached and the address of the mail server 300b that manages the electronic mail addressed to the destination address to the attachment file server 400. Instead, the attachment file processing part 310 may receive the storage location information indicating the storage location of the attachment file from the attachment file server 400. The attachment file processing part 310 embeds the received storage location information into the attachment position of the deleted attachment file. And the attachment file processing part 310 receives the corresponding attachment file information from the attachment file information acquisition part 315, adds the storage location information indicating the storage location of the attachment file to it, and transfers the attachment file information and the electronic mail into which the storage location information indicating the storage location instead of the attachment file is embedded to the mail server 300b that manages the electronic mail addressed to the destination address of the electronic mail.

Next, the attachment file server 400 comprises an attachment file management part 405, an attachment file storage device 410, and an update information notification part 415.

The attachment file management part 405 receives the decoded attachment file from the mail server 300a, together with the destination address of the electronic mail to which the attachment file is attached and the address of the mail server 300b that manages the electronic mail addressed to the destination address, and then stores it associated with the destination address and the address of the mail server 300b at a predetermined location of the attachment file storage device 410. And the attachment file management part 405 returns the storage location information indicating the storage location to the mail server 300a. As one example, the attachment file server 400 may be a Web server, and the storage location information indicating the storage location of the attachment file may be a URL address according to a storage destination directory.

The attachment file management part 405 receives an access request including the storage location information from the client apparatus 100, and then provides the attachment file stored in the storage location indicated by the storage location information to the client apparatus 100. When the attachment file server 400 is a Web server as described above, the client apparatus 100 activates the browser, and gains access to the attachment file server 400 that is the Web server with the URL address designated. The attachment file server 400 does not immediately return the requested attachment file, but transmits ahead a selection screen including the display, edit, store and delete buttons to prompt the user to select the process for the attachment file. And the attachment file management part 405 transmits the requested attachment file to the client apparatus 100, except when the selected process is "delete".

If the selected process is "delete", the attachment file management part 405 deletes the requested attachment file from the attachment file storage device 410. Also, if the selected process is "edit", the attachment file management part 405 receives the edit contents from the client apparatus 100, and edits the attachment file stored in the attachment file storage device 410 in accordance with the edit contents. And the attachment file management part 405 passes the type of the process for the attachment file by the user of the client apparatus 100 together with the storage location information of the attachment file to the update information notification part 415.

The update information notification part 415 receives the storage location information of the attachment file and the type of the process for the attachment file from the attachment file management part 405, and then reads the address of the mail server 300b associated with the attachment file from the attachment file storage device 410, based on the storage location of the attachment file. And the update information notification part 415 creates the update information including the storage location information of the attachment file and the type of the process for the attachment file and transmits it to the mail server 300b having the read address.

Next, the mail server 300b comprises a received mail management part 350, an electronic mail storage device 355, an attachment file information storage device 360, and an attachment file information management part 370.

The electronic mail storage device 355 comprises a plurality of mail boxes corresponding to the respective mail addresses of the plurality of client apparatuses 100 registered in the mail server 300b.

The received mail management part 350 has a conventional mail server function of receiving the electronic mail addressed to the registered client apparatus 100 from the mail server 300a and storing the received electronic mail in the corresponding mail box of the electronic mail storage device 355. The received mail management part 350 according to the invention further receives the attachment file information from the mail server 300a and passes it to the attachment file information management part 370, if the file is attached to the electronic mail.

The attachment file information management part 370 comprises a registration part 375 and an update part 380, and receives and manages the attachment file information from the received mail management part 350. That is, the registration part 375, upon receiving the attachment file information from the received mail management part 350, registers it in a table of the attachment file information storage device 360.

FIG. 12 shows one example of a table in the attachment file information storage device 360. The table of the attachment file information storage device 360 in the mail server 300b is substantially the same as the table of the attachment file viewer database 145 in the client apparatus 100 as described in the first embodiment, as shown in FIG. 12A. The table as shown in FIG. 12A does not have the column of AIV-ID, but instead, a column of URL indicating the storage location of the attachment file and a column of attachment mode indicating the attached form of the attachment file are newly added. The registration part 130 registers the storage location information in the column of URL, and registers the "call" in the column of attachment mode, if the storage location information indicating the storage location of the attachment file is included in the attachment file information.

If the storage location information indicating the storage location of the attachment file is not included in the attachment file information, the registration part 130 makes the column of URL and the columns of attachment file states blank and registers the "attached" in the column of attached form. Since the other columns are the same as described in the first embodiment, the explanation is omitted here to avoid the repetition.

In the first embodiment, since the attachment file is directly attached to the electronic mail, the attachment file A attached to the original electronic mail and the attachment file B attached to a part of the original electronic mail in the text of the reply or transfer mail including the original electronic mail were physically different in the client apparatus 100. Therefore, the attachment file information for each of the attachment file A and the attachment file B was registered in the table of the attachment file viewer database 145 for the client apparatus 100.

However, in the second embodiment, the attachment file A attached in a calling form to the original electronic mail, and the attachment file B attached in a calling form to a part of the original electronic mail in the text of the reply or transfer mail including the original electronic mail are the same attachment file stored in the attachment file server 400. Accordingly, one attachment file information corresponding to the attachment file A and the attachment file B is registered for two electronic mails of the original electronic mail including the attachment file A and the reply or transfer mail including the attachment file B in the table of the attachment file information storage device 360 of the mail server 300b. Referring to FIG. 12B, the details will be described below. In an example as shown in FIG. 12B, it is supposed that an image file a.jpg is attached in a calling form to the electronic mail of Message-ID=001. Also, it is supposed that the electronic mail of Message-ID=003 is the reply mail of the electronic mail of Message-ID=001.

One attachment file information on the image file a.jpg is registered for both Message-ID=001 and Message-ID=003, as shown in FIG. 12B. In other words, the attachment file information on the image file a.jpg is shared between Message-ID=001 and Message-ID=003. Since the attachment file positions are different between Message-ID=001 and Message-ID=003, two values are registered in the column of attachment file position.

The update part 380 receives a notification of update information including the storage location information of the attachment file and the type of the process for the attachment file from the attachment file server 400, when the attachment file server 400 is accessed by the user of the client apparatus 100, as described above. And if the type of the received process is "display", the update part 380 reads the value of the number of accesses in the attachment file information having the URL coincident with the received storage location information from the table of the attachment file information storage device 360, and increments this value by one. Similarly, if the type of the process is "edit", the update part 135 reads the value of the number of edits in the attachment file information having the URL coincident with the received storage location information from the table of the attachment file information storage device 360, and increments this value by one. Furthermore, if the type of the process is "delete", the update part 135 reads the value of the delete state in the attachment file information having the URL coincident with the received storage location information from the table of the attachment file information storage device 360, and updates it with the value of YES.

The received mail management part 350, like the conventional mail server, receives a request for mail reception from the authenticated client apparatus 100, and then reads the electronic mail from the corresponding mail box, and transfers it to the client apparatus 100. The received mail management part 350 according to the invention reads the corresponding attachment file information from the attachment file information storage device 360 and transfers it together with the electronic mail to the client apparatus 100, if the file is attached directly or indirectly to the electronic mail. If the electronic mail is a batch of one series of electronic mails that are repeatedly transferred or returned, and the attachment file is included in a calling form in any electronic mail, the corresponding attachment file information transmitted together with the electronic mail to the client apparatus 100 may include the attachment file information after update.

The functional configuration of the client apparatus 100 according to the second embodiment is fundamentally the same as that of the client apparatus 100 described in the first embodiment, and therefore, the explanation is omitted here to avoid the repetition. In the table of the attachment file viewer database 145 for the client apparatus 100 according to the second embodiment, a column of URL indicating the storage location of the attachment file and a column of attachment mode indicating the attached form of the attachment file are newly added, as shown in FIG. 13A. In this embodiment, the AIV-ID is also decided from the Message-ID, Subject, and attachment file name. Also, the value of each column of attachment file states of the attachment file information in which the attachment mode is "call" is updated by the attachment file information received from the mail server 300b. Further, the table of the attachment file viewer database 145 in the client apparatus 100 according to the second embodiment registers one attachment file information for a plurality of different electronic mails in which the storage location information indicating the same attachment file stored in the attachment file server 400 is embedded into the text (see FIG. 13B), as described with reference to FIG. 12B.

Figure 14:
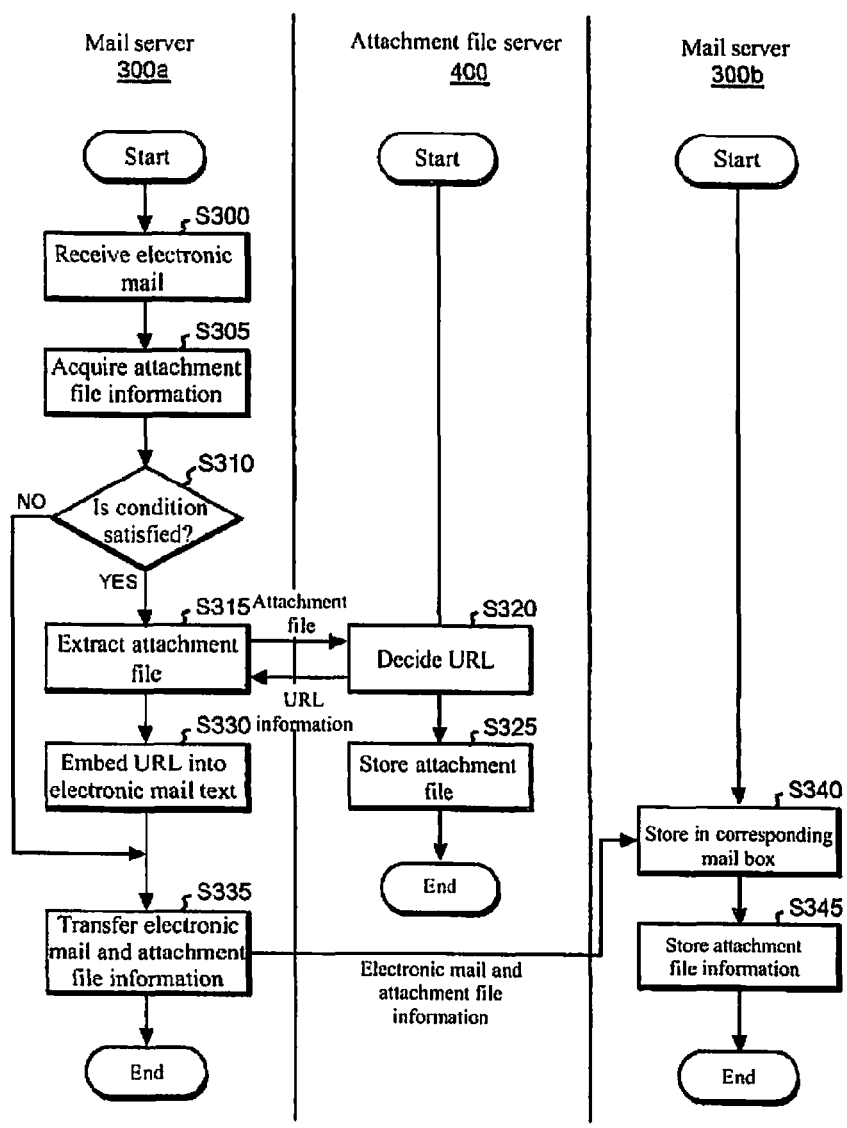
FIG. 14 is a flowchart showing one example of the flow of an attachment file information acquisition process according to the second embodiment of the invention.
Figure 15:
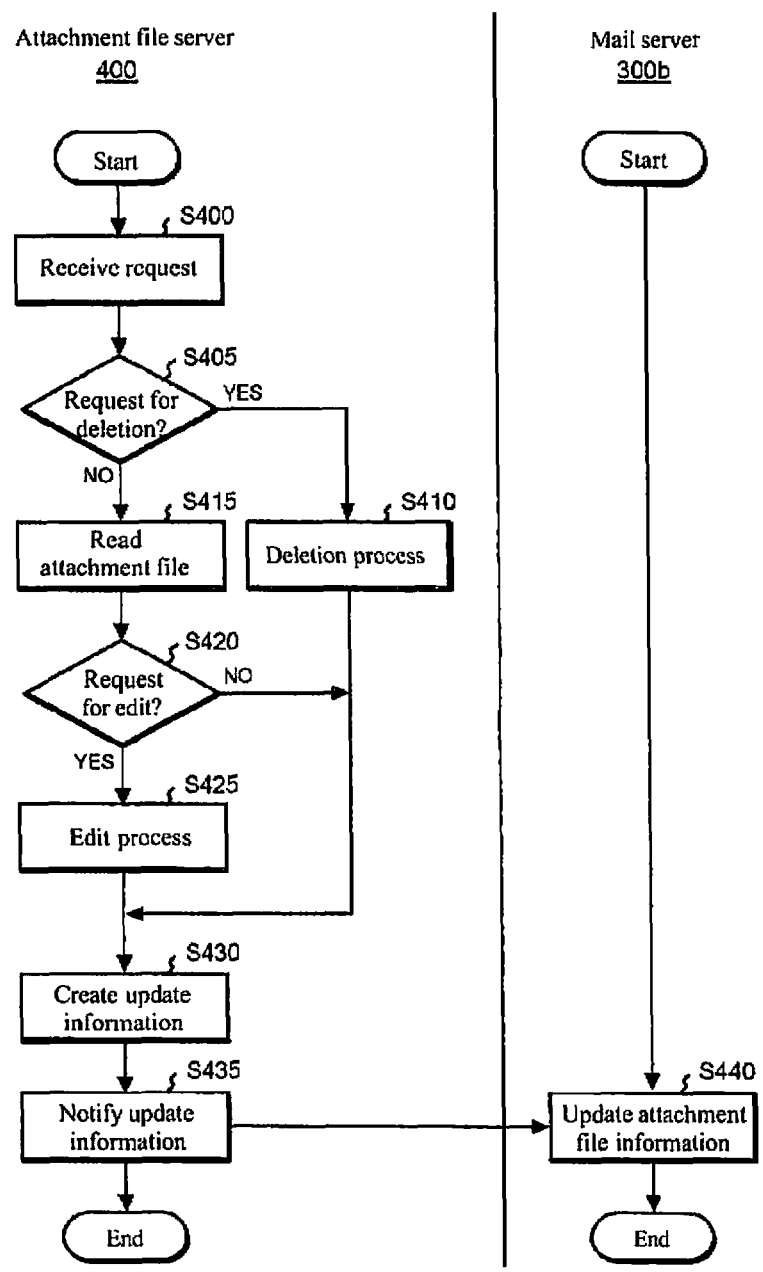
FIG. 15 is a flowchart showing one example of the flow of an attachment file information update process according to the second embodiment of the invention.
Figure 16:
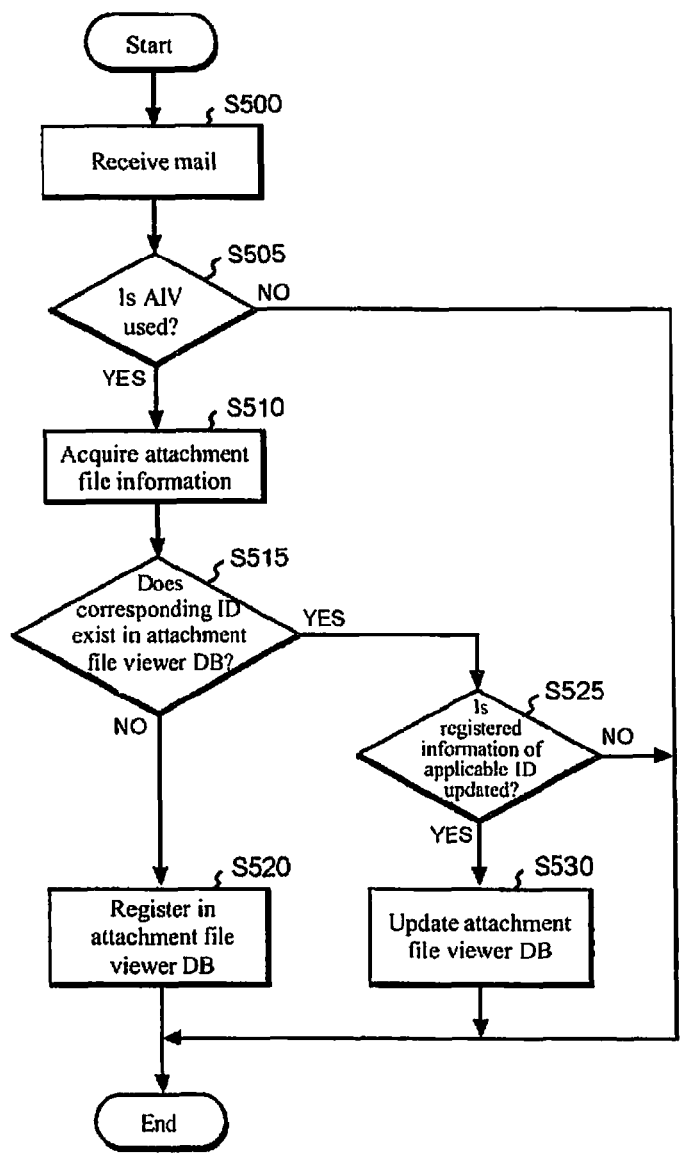
FIG. 16 is a flowchart showing one example of the flow of an attachment file information registration and update process according to the second embodiment of the invention.

Referring to FIGS. 14 to 16, the flow of processes for displaying the attachment file information according to the second embodiment of the invention will be described below. The flow of a display process for the attachment file information and an update process for the attachment file information in the client apparatus 100 is the same as in the first embodiment described with reference to FIGS. 8 and 9, and therefore, the explanation is omitted here to avoid the repetition.

FIG. 14 is a flowchart showing one example of the flow of an attachment file information acquisition process in a mail server system comprising the mail servers 300a and 300b and the attachment file server 400 according to the second embodiment. In FIG. 14, the process starts at step 300, where the mail server 300a receives the electronic mail with attachment file from the client apparatus 100 that transmits the electronic mail, and acquires the attachment file information including the attachment position information of the attachment file from the electronic mail (step 305). Next, the mail server 300a judges whether or not the attachment file satisfies a predetermined condition (step 310). If it is judged that the attachment file satisfies the predetermined condition (step 310: YES), the mail server 300a deletes and extracts the attachment file from the electronic mail, decodes it, and passes it to the attachment file server 400 (step 315).

The process in the attachment file server 400 starts upon receiving the attachment file from the mail server 300a. The attachment file server 400 decides the location of storing the received attachment file, and returns the storage location information (URL) indicating the storage location to the mail server 300a (step 320). And the attachment file server 400 stores the attachment file in the decided storage location (step 325), and the process in the attachment file server 400 is ended.

On the other hand, the mail server 300a receives the storage location information (URL) indicating the storage location of the attachment file from the attachment file server 400 (step 315), and embeds the storage location information (URL) into the attachment position of the deleted attachment file (step 330). If decision at step 310 is NO, that is, if it is judged that the attachment file does not satisfy the predetermined condition, or if the process advances from step 330 to step 335, the mail server 300a transfers the electronic mail and the corresponding attachment file information to the mail server 300b that manages the electronic mail addressed to the destination address of the electronic mail (step 335). And the process in the mail server 300a is ended.

The process in the mail server 300b starts upon receiving the electronic mail and the corresponding attachment file information from the mail server 300a. The mail server 300b stores the received electronic mail in the corresponding mail box of the electronic mail storage device 355 (step 340). Also, the mail server 300b stores the attachment file information including the attachment position information of the attachment file and the message identifier of the electronic mail to which the attachment file is attached in the attachment file information storage device 360 (step 345). And the process in the mail server 300b is ended.

FIG. 15 is a flowchart showing one example of the flow of an attachment file information update process in the mail server system comprising the mail servers 300b and the attachment file server 400 according to the second embodiment. In FIG. 15, the process starts at step 400, where the attachment file server 400 receives a request for the attachment file including the storage location information (URL) from the client apparatus 100. The attachment file server 400 judges whether or not the request for the attachment file is "delete" (step 405). If the request is "delete" (step 405: YES), the attachment file server 400 deletes the attachment file stored at the location indicated by the storage location information (URL) from the attachment file storage device 410 (step 410).

On the other hand, if the request for the attachment file is not "delete" (step 405: NO), the attachment file server 400 reads the attachment file from the location indicated by the storage location information (URL) (step 415), and judges whether or not the request for the attachment file is "edit" (step 420). If the request is "edit" (step 420: YES), the attachment file server 400 receives the edit information indicating the edit contents from the client apparatus 100, and performs an edit process for the attachment file stored at the location indicated by the storage location information (URL), based on edit information (step 425).

If decision at step 420 is NO, that is, if the request for the attachment file is not "edit", or if the process advances from step 410 or step 425 to step 430, the attachment file server 400 creates the update information including the storage location information (URL) of the attachment file and the type of the process for the attachment file (step 430). And the attachment file server 400 transmits the created update information to the mail server 300b (step 435), and the process in the attachment file server 400 is ended.

The process in the mail server 300b starts upon receiving the update information from the attachment file server 400.

The mail server 300b reads the attachment file information having the storage location information coincident with the storage location information included in the received update information from the attachment file information storage device 360, and updates the value in the applicable column of the attachment file state in the attachment file information, based on the type of the update process included in the update information (step 440). And the process in the mail server 300b is ended.

FIG. 16 is a flowchart showing one example of the flow of a registration and update process for the attachment file information in the client apparatus 100 according to the second embodiment. The process in FIG. 16 starts when the electronic mail client is activated on the client apparatus 100 and the electronic mail client transmits a request for the electronic mail reception to the mail server 300b. In FIG. 16, the process starts at step 500, where the client apparatus 100 gains access to the mail server 200b with which it is registered, and receives the electronic mail. Next, the client apparatus 100 judges whether or not the attachment file information display function is usable by seeing the AIV flag (step 505). If the AIV flag indicates OFF (step 505: NO), the process is ended.

On the other hand, if the AIV flag indicates ON (step 505: YES), the process goes to step 510, where the client apparatus 100 receives the attachment file information corresponding to the received electronic mail from the mail server 300b. Next, for the received attachment file information, the client apparatus 100 decides the AIV-ID from the Message-ID, Subject and attachment file name included in the attachment file information. And the client apparatus 100 judges whether or not the attachment file information having the AIV-ID coincident with the decided AIV-ID already exists in the attachment file viewer database 145 according to the second embodiment (step 515).

If the attachment file information having the coincident AIV-ID does not exist (step 515: NO), the process goes to step 520, where the client apparatus 100 registers the received attachment file information in the attachment file viewer database 145 (step 520), and the process is ended. On the other hand, if the attachment file information having the coincident AIV-ID exists (step 515: YES), the process goes to step 525, where the client apparatus 100 compares each column of the attachment file states of the received attachment file information and each column of the attachment file states of the attachment file information having the coincident AIV-ID, and judged whether or not the attachment file information having the coincident AIV-ID should be updated.

If it is judged that the attachment file information should be updated (step 525: YES), the client apparatus 100 updates the attachment file information having the coincident AIV-ID with the received attachment file information (step 530), and the process is ended. If decision at step 525 is NO, that is, if it is judged that the attachment file information should not be updated, the process is ended.

Figure 17:
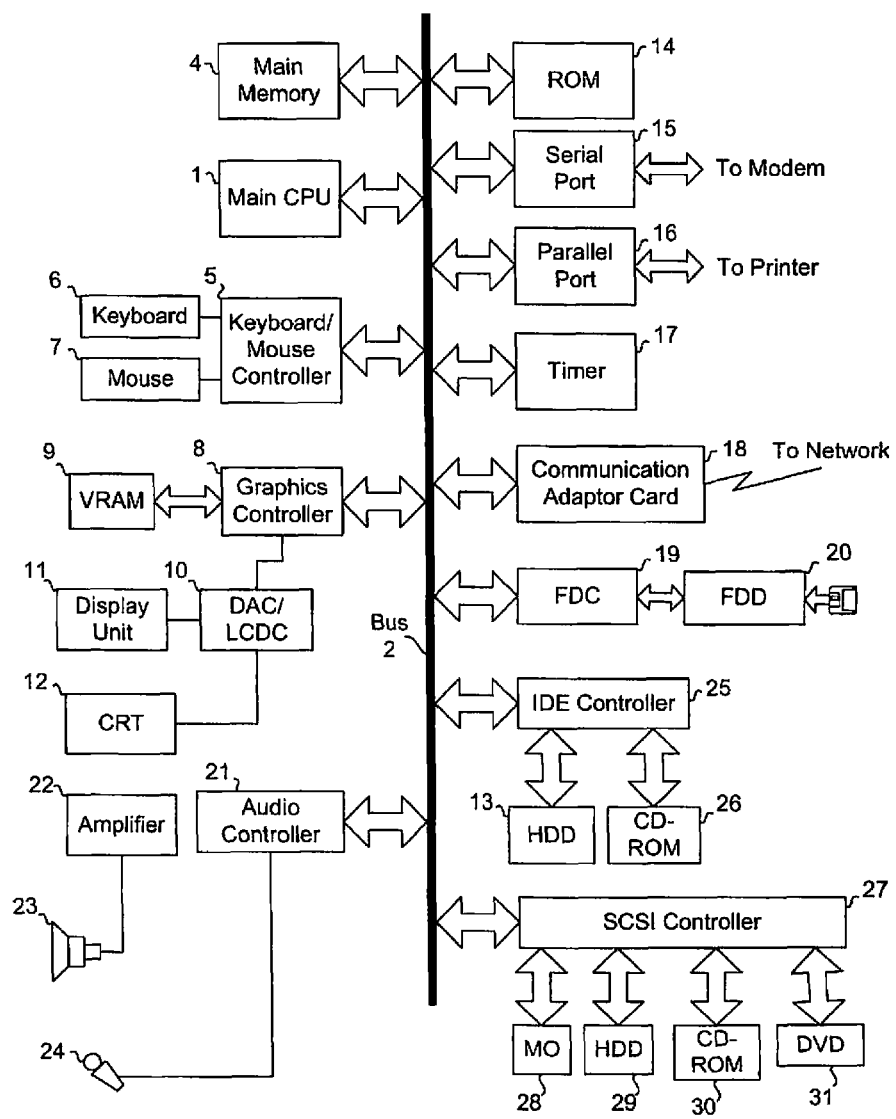
FIG. 17 is a view showing one example of the hardware configuration of an information processing apparatus suitable to implement the client apparatus 100, the mail servers 200 and 300, and the attachment file server 400 according to the embodiment of the invention.

FIG. 17 is a view showing one example of the hardware configuration of an information processing apparatus suitable for implementing the client apparatus 100, the mail servers 200 and 300 and the attachment file server 400 according to the embodiment of the invention. The information processing apparatus comprises a CPU (Central Processing Unit) 1 and a main memory 4 connected to a bus 2. The hard disk units 13 and 30, and the removable storages (external storage systems capable of exchanging the recording media) such as CD-ROM devices 26 and 29, a flexible disk unit 20, an MO unit 28 and a DVD unit 31 are connected via a floppy (registered trademark) disk controller 19, an IDE controller 25 and a SCSI controller 27 to the bus 2.

The recording medium such as a flexible disk, an MO, a CD-ROM or a DVD-ROM is inserted into a removable storage. In these storage media or hard disk units 13 and 30 and the ROM 14, the code of a computer program product for practicing the invention can be recorded by giving an instruction to the CPU in cooperation with an operating system.

That is, the various storage devices for the information processing apparatus as the client apparatus 100 can store an electronic mail client for performing the basic processes for transmitting and receiving, creating and displaying the electronic mail, and an electronic mail display program product according to the invention operating in cooperation with the electronic mail client. Also, the storage device for the information processing apparatus as the mail servers 200 and 300 and the attachment file server 400 can store a basic program product for providing the basic services of transmitting and receiving the electronic mail to the client apparatus 100, and the electronic mail display program product according to the invention operating in cooperation with the basic program product. The electronic mail display program product on the client side for practicing the invention can be made a part of the electronic mail client. Similarly, the electronic mail display program product on the server side for practicing the invention can be made a part of the basic program product.

These plural computer program products are loaded into the main memory 4 and executed. The computer program product may be compressed, or divided into plural blocks and stored in multiple media.

The information processing apparatus accepts inputs from an input device such as a keyboard 6 or a mouse 7 via a keyboard/mouse controller 5. The information processing apparatus accepts inputs from a microphone 24 via an audio controller 21 and outputs the voice from a speaker 23. The information processing apparatus is connected to a display unit 11 for presenting visual data to the user via a graphic controller 10. The information processing apparatus can be connected via a network adaptor 18 (Ethernet (registered trademark) card or token ring card) to the network to make the communication with another computer.

From the above description, it will be easily understood that the information processing apparatus suitable for implementing the attachment file information display system according to the embodiment of the invention can be realized by the information processing apparatus such as an ordinary personal computer, a workstation or a main frame, or a combination thereof. The above components are illustrative, and all the components are not requisite components for the invention.

Though the invention has been described above using the embodiments, the technical scope of the invention is not limited to the scope as described in the embodiments. It will be apparent to those skilled in the art that various changes or improvements may be made to the above embodiments. Accordingly, such changes or improvements may be naturally included in the technical scope of the invention.

What is claimed is:

1. An electronic mail display program product, including: a program storage device readable by a computer; and a program of instructions tangibly embodied on the program storage device and executable by the computer to perform method steps for displaying an electronic mail, the method steps comprising:
   receiving an electronic mail from a remote source, said electronic mail including a mail text and an attachment file separate from said mail text
   acquiring attachment position information, said attachment position information being separate from said mail text and said attachment file, said attachment position information comprising an x and y coordinate with respect to a reference location, said attachment position information indicating an attachment position within said mail text of said electronic mail with which said attachment file of the received electronic mail is associated;

storing said acquired attachment position information associated with a corresponding identifier of said electronic mail; and responsive to a user instruction to display the electronic mail, displaying said mail text together with a graphic representing said attachment file of said electronic mail on a mail screen for displaying said electronic mail, said graphic representing said attachment file being displayed on said mail screen at a location within said mail text corresponding to said attachment position without opening said attachment file, said graphic being selectable by the user to open said attachment file.

2. The electronic mail display program product according to claim 1, wherein said attachment position information is acquired from a mail server that stores the electronic mail addressed to said computer.

3. The electronic mail display program product according to claim 1, wherein said attachment position information includes the number of characters and the number of line feeds from the text head of said electronic mail to the attachment position of said attachment file.

4. The electronic mail display program product according to claim 1, wherein the method further comprises the steps of: acquiring attribute information regarding said attachment file of said received electronic mail, and said graphic representing said attachment file of said electronic mail is different depending on said attribute information of said attachment file.

5. The electronic mail display program product according to claim 4, wherein said attribute information includes a file type and a file size of said attachment file.

6. The electronic mail display program product according to claim 4, wherein said attribute information includes the attached state information indicating an attached state of said attachment file, and the method further comprises the steps of: updating said attached state information included in said attribute information of said attachment file from an attached state to a deleted state in response to a delete instruction for deleting the attachment file from a user of said computer.

7. The electronic mail display program product according to claim 4, wherein said attribute information includes the number of accesses to said attachment file, and the method further comprises the steps of: incrementing said number of accesses included in said attribute information of said attachment file in response to an execution instruction for the attachment file from a user of said computer.

8. The electronic mail display program product according to claim 4, wherein said attribute information includes the number of edits of said attachment file, and the method further comprises the steps of: incrementing said number of edits included in said attribute information of said attachment file in response to an edit instruction for the attachment file from a user of said computer.

9. The electronic mail display program product according to claim 1, wherein the method further comprises the steps of: prompting a user of said computer to select a process for said attachment file corresponding to said selected graphic from among display, edit, store and delete in response to a selection instruction for said graphic on said mail screen from said user.

10. The electronic mail display program product according to claim 1, wherein the method further comprises the steps of: detecting a state where the cursor is put on said graphic on said mail screen, and displaying attribute information of said attachment file corresponding to said graphic on which said cursor is put near said cursor in response to said detection.

11. The electronic mail display program product according to claim 1, wherein said electronic mail is a batch of one series of electronic mails that are repeatedly transferred or replied.

12. The electronic mail display program product according to claim 1, wherein displaying said mail text together with a graphic representing said attachment file of said electronic mail on a mail screen for displaying said electronic mail comprises displaying a graphic representing said attachment file of said electronic mail on a child screen for displaying a reduced screen of a parent screen for displaying said electronic mail based on said corresponding attachment position information and displaying said child screen together with said parent screen.

13. The electronic mail display program product according to claim 12, wherein the method further comprises the steps of: detecting a state where a cursor is located on said child screen, and displaying in up scale said child screen near the position of said cursor in response to said detection.

14. The electronic mail display program product according to claim 12, wherein said parent screen has a scroll function, and said child screen displays in down scale the entire text of said electronic mail.

15. An electronic mail display program product, including: a program storage device readable by a mail server; and a program of instructions tangibly embodied on the program storage device and executable by the mail server to perform method steps for displaying an electronic mail, the method steps comprising:

receiving an electronic mail from a remote source, said electronic mail including a mail text and an attachment file separate from said mail text;

acquiring attachment position information, said attachment position information being separate from said mail text and said attachment file, said attachment position information comprising an x and y coordinate with respect to a reference location, said attachment position information indicating an attachment position within said mail text of said electronic mail with which said attachment file of the received electronic mail is associated;

extracting said attachment file from said electronic mail and storing said extracted attachment file in an attachment file storage device;

embedding storage location information indicating a storage location of said attachment file;

storing said electronic mail into which said storage location information of said attachment file is embedded in a corresponding mail box, based on the destination information;

storing said attachment position information associated with said storage location information and an identifier of said electronic mail in an attachment file information storage device; and transmitting said electronic mail stored in said corresponding mail box together with said corresponding attachment position information to a client apparatus in response to a reception request for the electronic mail from said client apparatus for use by said client apparatus in displaying said mail text together with a graphic representing said attachment file, said graphic representing said attachment file being displayed at a location with said mail text corresponding to said attachment position information without opening said attachment file, said graphic being selectable by the user to open said attachment file.

16. The electronic mail display program product according to claim 15, wherein the method further comprises the steps of: acquiring attribute information of the attachment file of the received electronic mail, storing the acquired attribute information in said attachment file information storage device, performing a process in accordance with the contents of a request in response to said request from said client apparatus including said storage location information of said attachment file, and updating said attribute information of said corresponding attachment file in accordance with said process that is performed.

17. The electronic mail display program product according to claim 16, wherein said electronic mail is a batch of one series of electronic mails that are repeatedly transferred or replied, and said transmitting said electronic mail to said client apparatus includes transmitting said electronic mail together with said corresponding attachment position information and said attribute information after update to said client apparatus.

18. A digital data processing device which displays electronic mail, comprising:
 a processor;
 a data storage;
 a communications interface for communicating with an external network and receiving electronic mail therefrom;
 a display for displaying information, including electronic mail, to a user;
 an electronic mail management function executable on said processor, said electronic mail management function for presenting items of electronic mail received via said communications interface on said display, at least some items of electronic mail comprising a respective mail text, a respective at least one attachment file separate from said mail text, and respective attachment position information corresponding to each said respective at least one attachment file, said attachment position information being separate from the respective mail text and the corresponding attachment file, each said attachment position information comprising a respective x and y coordinate with respect to a reference location, each said attachment position information indicating an attachment position within the respective mail text of the respective electronic mail with which the corresponding attachment file of the received electronic mail is associated;

wherein, responsive to a user instruction to display a selected item of electronic mail containing mail text, at least one attachment file, and attachment position information corresponding to each attachment file, said electronic mail management function causes presentation on said display of a mail screen displaying the selected item of electronic mail, the mail screen including the mail text contained in the selected item of electronic mail together with a respective graphic representing each attachment file of the at least one attachment file contained in the selected item of electronic mail, each said graphic being displayed on said mail screen at a respective location within the mail text corresponding to the attachment position of the corresponding attachment file indicated by the corresponding attachment position information, each said graphic being displayed without opening the corresponding attachment file, each said graphic being selectable by the user to open the corresponding attachment file.

\* \* \* \* \*